(12) United States Patent
Farretta

(10) Patent No.: US 6,293,519 B1
(45) Date of Patent: Sep. 25, 2001

(54) LUMINOUS SNAKE

(76) Inventor: Peter Farretta, 114 Chickering Rd., Dedham, MA (US) 02026

( * ) Notice: Subject to any disclaimer, the term of this patent is extended or adjusted under 35 U.S.C. 154(b) by 0 days.

(21) Appl. No.: 09/324,415

(22) Filed: Jun. 2, 1999

Related U.S. Application Data

(63) Continuation-in-part of application No. 08/888,972, filed on Jul. 7, 1997, now abandoned.

(51) Int. Cl.⁷ .................................................. E21C 29/16
(52) U.S. Cl. .................................................. 254/134.3 FT
(58) Field of Search ..................... 362/84; 254/134.3 R, 254/134.3 FT

(56) References Cited

U.S. PATENT DOCUMENTS

| | | |
|---|---|---|
| D. 303,855 | 10/1989 | Moss . |
| 2,727,720 * | 12/1955 | Barth .......................... 254/134.3 FT |
| 3,891,188 | 6/1975 | Pierce . |
| 3,950,934 | 4/1976 | Irwin . |
| 3,972,386 * | 8/1976 | Hayslip ................................... 182/50 |
| 3,979,106 | 9/1976 | Jacques . |
| 4,724,327 | 2/1988 | Mitchell . |
| 5,071,118 | 12/1991 | Barnett . |
| 5,752,761 | 5/1998 | Pietruczynik et al. . |
| 5,947,460 * | 9/1999 | Williams ................................. 269/37 |

* cited by examiner

Primary Examiner—Robert C. Watson
(74) Attorney, Agent, or Firm—Lambert and Associates; Gary E. Lambert; Donald J. MacDonald

(57) ABSTRACT

A snake apparatus with a phosphorescent coating used for feeding electrical wires through spaces contained within existing structures. The snake apparatus with phosphorescent coating is easy to use, electrically non-conductive and capable of providing sufficient luminescence to enable the snake apparatus to be visible without the benefit of ambient light several hours later.

1 Claim, 3 Drawing Sheets

LUMINOUS SNAKE

This is a continuation-in-part of application Ser. No. 08/888,972 filed Jul 7, 1997 now abandoned. The parent application is currently pending in the United States Patent and Trademark Office.

BACKGROUND OF THE INVENTION

This invention relates to an apparatus for feeding electrical cables through existing structures. In particular, this invention is concerned with an electrician's snake that is visible and easy to locate in the low light environments of ducts, wall cavities and other passages used to house electrical wiring.

Various devices have been employed in the past to facilitate the installation of electrical conductors in conduits, raceways, wall cavities, ceiling plenums and other passageways. Light weight and flexible chains have commonly been used to aid in the feeding of electrical cables. Light weight chains however are only practical for feeding electrical conductors or guidelines where one end of the chain can be lowered from a higher position through a passageway to a lower position. Once one end of the chain is lowered from the higher position to the lower position then the electrical conductor can be attached to the end of the chain and pulled via the chain through the passageway up to the higher position. Another common device often used to ease installation of electrical conductors in passages is an electrician's "snake" or "fish tape". A conventional snake typically comprises a flattened strip of metal. The snake is typically used to feed cables through a passage by first advancing the snake through the passage, attaching the electrical conductor or guideline to the leading end of the snake and then pulling the snake and attached conductor back through the conductor.

Electrician's snakes of the type described have proven to be difficult to use, especially in passages already occupied with electrical conductors. When using the snake in an empty passageway or duct, there is little chance of the snake becoming tangled or otherwise obstructed. If advancement of the snake through the passage does become encumbered, the snake can be pulled out and another attempt at feeding the snake through the passage can be made without fear of snagging or damaging other electrical conductors. In the case where there are preexisting electrical conductors in the passageway, the snake can and often does become entangled with or otherwise encumbered by the preexisting electrical conductors in the passage. Since the long, narrow and confined passageways housing electrical conductors are dimly illuminated or completely dark it is often difficult or impossible to determine exactly where and upon what the snake is entangled. Even when the end of the snake being advanced through the passageway is relatively near an end opening of the passageway, locating the end of the snake to attach the electrical conductor to be pulled can be difficult due to the dimly lit passageway. Locating the end of the snake is a problem encountered when working in passages with or without other preexisting electrical conductors—the problem is more pronounced in passages having other electrical conductors however. In addition to not being able to determine exactly where and upon what the snake is entangled, the metallic snake may itself become an electrical conductor if the snake comes into contact with an uninsulated electrical conductor, thereby posing a hazard to the operator of the snake.

SUMMARY OF THE INVENTION

In accordance with this invention it is therefore an objective to provide a luminous snake device that aids in the feeding of electrical conductors through an electrical conduit and yet is easy to locate and identify in the dimly lit confines of an electrical conduit or other existing passageway and therefore eases location and use of the snake.

It is a further object of this invention to provide such a luminous snake device wherein the luminous snake device is electrically non-conductive.

It is a further object of this invention to provide such a luminous snake device wherein the luminous snake is easy to manufacture and produce.

It is a further object of this invention to provide such a luminous snake device wherein the luminous snake is preserved by the coating thereon which results in the increased life of the snake.

This invention results from the realization that a higher visibility and therefore a better and easier locating electrician's snake is effectuated by making a snake of a flattened metallic strip coated with a phosphorescent coating. The phosphorescent coating of the present invention is capable of remaining visibly illuminated without ambient light several hours after having been exposed to ambient light. In addition, when the core strip of the luminous snake is coated with a sufficient thickness of the phosphorescent coating material, the phosphorescent coating effectively provides an electrically non-conducive insulating barrier to the luminous snake.

This invention features an electrician's snake comprising a thin and flexible metallic core strip for feeding through electrical conduits; and a phosphorescent coating applied to the core strip that is capable of providing visible illumination in the absence of ambient light long after initially being exposed to ambient light.

The core strip of this invention is typically constructed from a flattened strip of metal. The metal core strip is flexible to the extent that the core strip is capable of folding upon itself This degree of flexibility and resiliency in the core strip allows the snake to have a small bending radius without risk of permanent deformity to the snake. The flexibility, resiliency and small bending radius of the core strip is important to the functionality of the invention since it permits the snake to be fed through passages having numerous and various turns with ease.

The phosphorescent coating of the snake is typically a paint having luminescent properties. The luminescent properties of the phosphorescent coating applied to the core strip are such that the core strip coating, and thus the snake itself, is visible in low ambient light conditions after being initially exposed to light of suitable wavelength.

In another embodiment of the present invention the phosphorescent material of the snake is an integral part of the core strip. That is, the phosphorescent material having luminescent properties is incorporated into the structure of the material comprising the core strip. In this particular embodiment, the luminescent characteristics of the snake are maintained even if the outer surface of the subject invention becomes nicked or otherwise damage. Even if portions of the snake become worn through use, the snake maintains its luminescent properties throughout the entirety of its length.

The terminal ends of this invention may be fashioned in a variety of shapes in order to facilitate (1) the advancement and retrieval of the snake and (2) the attachment of electrical conductors to the end of the snake. As such, one end of the snake may be shaped to facilitate the attachment of electrical conductors or guidelines and the other end of the snake may be shape to facilitate the snake operator's grip on the snake

BRIEF DESCRIPTION OF THE DRAWINGS

The novel features considered characteristic of the invention are set forth in the appended claims. The invention itself, however, both as to its construction and its method of operation, together with additional objects and advantages thereof, will best be understood from the following description of the specific embodiments when read and understood in connection with the accompanying drawing.

DETAILED DESCRIPTION OF THE PREFERRED EMBODIMENT

Figure 1:
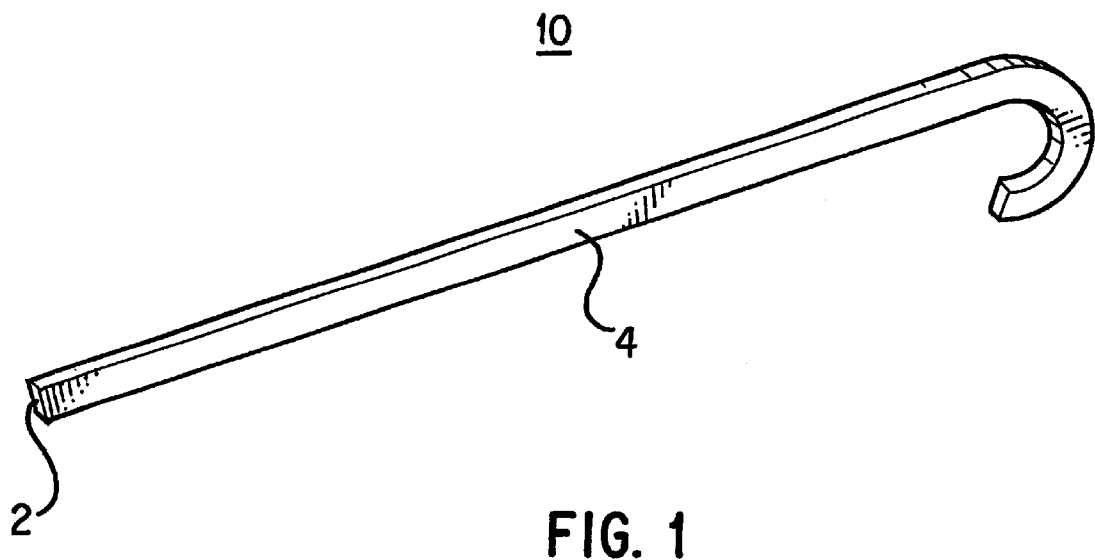
FIG. 1 is a perspective view of the snake of this invention.

Luminous snake 10, FIG. 1 of this invention includes an elongated, thin and flexible core strip 2 and a phosphorescent outer layer 4. The core strip 2 terminates at two ends, attachment end 1 and manipulator end 3.

The elongated, thin and flexible core strip 2 is ordinarily substantially longer in length than its cross-sectional width. The core strip 2 is typically constructed of a flattened strip of metallic material. Due to the form and material composition of the core strip 2, the core strip 2 has the characteristics of being flexible and capable of being bent upon itself and yet resistive to permanent deformity. The deforming resistant properties of the core strip 2 allows the operator of the luminous snake 10 to use the luminous snake 10 repeatedly in electrical conduits of varying configurations.

Referring to FIG. 1, the core strip 2 is coated with a phosphorescent coating 4. The phosphorescent coating 4 is typically applied over substantially the entirety of the core strip 2. In addition to having the phosphorescent coating applied to the length of the core strip, application of the phosphorescent coating 4 extends to the attachment end of the luminous make. Since the phosphorescent coating 4 is applied to the entirety of the core strip 2 including he attachment end 1, the luminous snake 10 is easy to locate along its length and at its end terminating at attachment end 1.

Figure 2:
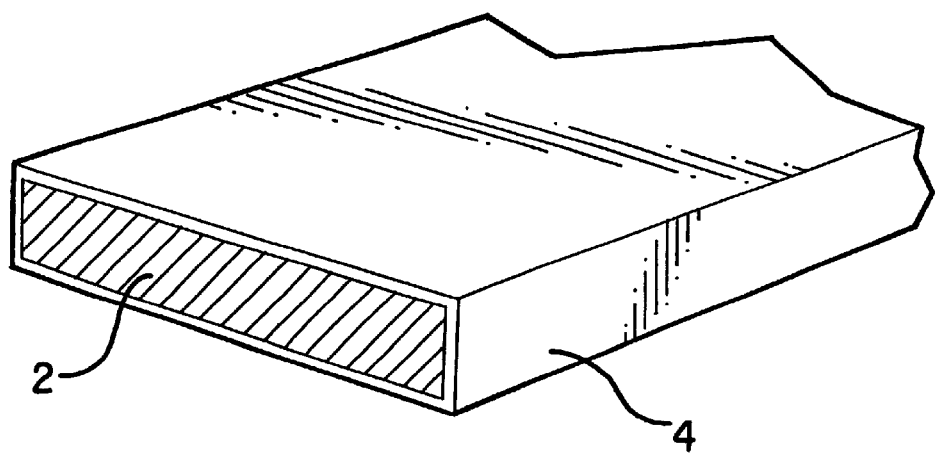
FIG. 2 is a cross-sectional detail view of a section of the core strip and phosphorescent coating of the snake shown in FIG. 1.

The phosphorescent coating 4 is typically applied to the core strip 2 in sufficient thickness to form an electrically non-conductive barrier on the core strip, see FIG. 2. The electrically non-conductive barrier formed by the sufficiently thick phosphorescent coating 4 thereby electrically insulates the metallic core strip of the preferred embodiment from electrical conductors. Thus, the insulated luminous snake 10 formed by the sufficient phosphorescent coating 4 disposed on the metallic core strip 2 greatly reduces the hazard of electrical shock to the operator of the luminous snake.

Figure 5:
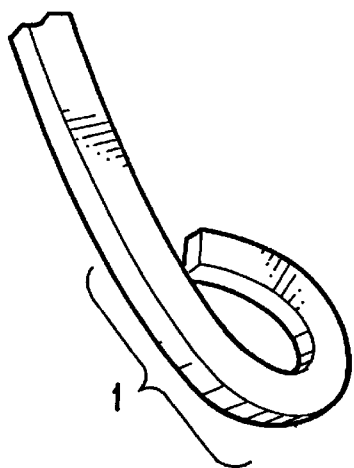
FIG. 5 is a modified form of the subject invention wherein the attachment end of the snake is shaped to facilitate attaching electrical conductors to the snake operator.

The attachment end 1 of the luminous snake may be shaped to facilitate the attachment or grasping of the electrical conductors as shown in FIG. 5. The particular shape of the attachment end 1 depicted in FIG. 5 is merely shown to illustrate that the attachment end 1 may be shaped in a manner to better facilitate the attachment of electrical conductors and is not meant as a limitation to the configuration of the attachment end 1.

Figure 6:
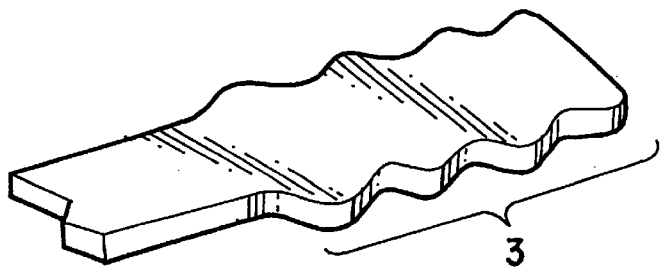
FIG. 6 is a modified form of the subject invention wherein the manipulator end of the snake is shaped to facilitate advancement and retrieval of the snake through electrical conduit and passageways.

The manipulator end 3 of the luminous snake may be shaped to facilitate the advancement and retrieval of the luminous snake by the operator as shown in FIG. 6. The particular shape of the manipulator end 3 depicted in FIG. 6 is merely shown to illustrate that the attachment end 3 may be shaped in a manner to better facilitate the advancement and retrieval of the luminous snake 10 in electrical conduits and is not meant as a limitation to the configuration of the manipulator end 3.

Figure 3:
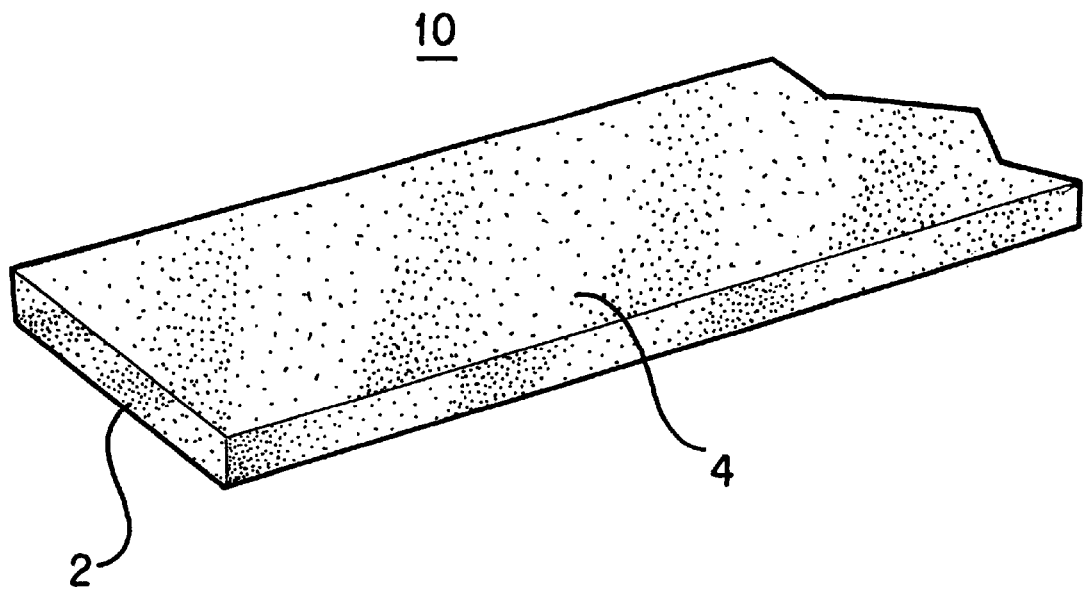
FIG. 3 is a modified form of the subject invention incorporating a snake made entirely of phosphorescent material.
Figure 4:
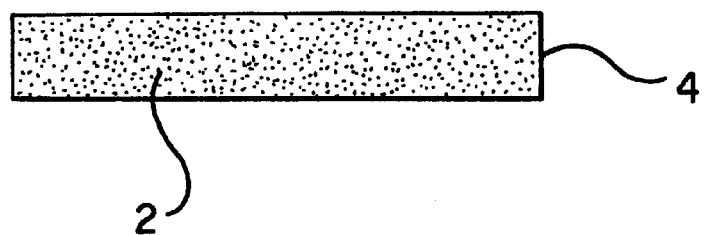
FIG. 4 is a cross-sectional detail view of the invention as shown in FIG. 3.

In another embodiment of the present invention, the core strip 2 of the luminous snake 10 is made by integrally incorporating the phosphorescent coating 4 into the core strip 2 as shown in FIG. 3. The luminous snake of FIG. 3 is substantially uniform throughout its structure as depicted in the detailed drawing of FIG. 4. That is, the composition of the snake is substantially uniform at all points throughout the structure. An added benefit gained by incorporating the phosphorescent coating into the core strip is that the luminous snake 10 maintains its luminescent properties even when the outer surface layer of the snake is worn or otherwise damaged.

Figure 7:
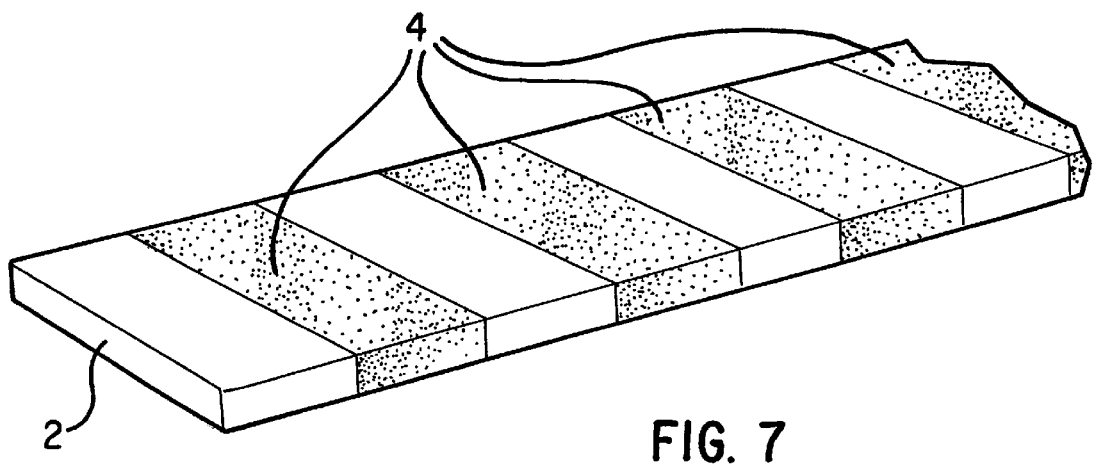
FIG. 7 is a modified form of the present invention wherein the phosphorescent coating is intermittently to the core strip.

In another embodiment of the present invention, the phosphorescent coating 4 of the luminous snake 10 is intermittently disposed upon the core strip 2 as shown in FIG. 7. This particular embodiment too is easier to locate in a dimly lit electrical conduit than a conventional snake.

As such the method of making and using the device detailed above constitute the inventor's preferred embodiment and alternate embodiments to the invention. The inventor is aware that numerous configurations of the device as a whole or some of its constituent parts are available which would provide the desired results. While the invention has been described and illustrated with reference to specific embodiments, it is understood that these other embodiments may be resorted to without departing from the invention. Therefore the form of the invention set out above should be considered illustrative and not as limiting the scope of the following claims.

What is claimed is:

1. A snake apparatus of the type used to feed electrical wires through spaces contained within existing structures comprising:

a thin, flexible, flattened core strip capable of being flattened upon itself having two ends, an attachment end and a manipulator end and a length substantially longer than its cross-sectional width;

a phosphorescent coating, said coating to be applied to said core strip; wherein said, coating is applied in sufficient thickness and entirety to form an electrically non-conducive barrier effectively insulating said strip of metal; wherein said coating is capable of providing sufficient luminescence to enable the strip of metal to be visible without the benefit of ambient light several hours later;

wherein said core strip is made of a metallic material, said thin, flexible, flattened metallic core strip being resilient and resistant to permanent deformation, wherein the attachment end is further shaped to facilitate the attachment of electrical conductors for feeding electrical conductors through electrical conduits and passageways;

wherein said manipulator end is further shaped to facilitate the advancement and retrieval of the snake through electrical conductors and passageways by the operator of snake;

wherein said phosphorescent coating applied to said core strip is applied intermittently spaced on said core strip thereby leaving portions of the core strip exposed and uncoated with said phosphorescent coating.

* * * * *